(12) United States Patent
Eron et al.

(10) Patent No.: US 8,163,077 B2
(45) Date of Patent: Apr. 24, 2012

(54) INK PROVIDING ETCH-LIKE EFFECT FOR PRINTING ON CERAMIC SURFACES

(75) Inventors: Gera Eron, Tel Mond (IL); Avi Feinschmidt, Holon (IL); Shlomo Magdassi, Jerusalem (IL); Yelena Vinetsky, Jerusalem (IL); Eliane Liraz, Drom Hasharon (IL)

(73) Assignees: Yissum Research Development Company of the Hebrew University of Jerusalem, Jerusalem (IL); DIP Tech. Ltd., Kfar Saba (IL)

( * ) Notice: Subject to any disclaimer, the term of this patent is extended or adjusted under 35 U.S.C. 154(b) by 658 days.

(21) Appl. No.: 11/992,536

(22) PCT Filed: Sep. 28, 2006

(86) PCT No.: PCT/IL2006/001143
§ 371 (c)(1),
(2), (4) Date: May 6, 2009

(87) PCT Pub. No.: WO2007/036942
PCT Pub. Date: Apr. 5, 2007

(65) Prior Publication Data
US 2009/0214840 A1 Aug. 27, 2009

Related U.S. Application Data

(60) Provisional application No. 60/721,100, filed on Sep. 28, 2005.

(51) Int. Cl.
*C09D 11/02* (2006.01)

(52) U.S. Cl. .......... 106/31.9; 106/31.65; 106/31.85; 106/31.86; 106/31.95; 501/14; 427/372

(58) Field of Classification Search ............. 106/31.9, 106/31.6, 31.65, 31.85, 31.86, 31.95; 501/14
See application file for complete search history.

(56) References Cited

U.S. PATENT DOCUMENTS

| | | | |
|---|---|---|---|
| 5,743,946 A * | 4/1998 | Aoki et al. | 106/31.95 |
| 6,245,138 B1 * | 6/2001 | Nyssen et al. | 106/31.86 |
| 6,332,943 B1 * | 12/2001 | Herrmann et al. | 156/277 |
| 6,336,723 B1 * | 1/2002 | Nicolin | 347/105 |
| 6,346,493 B1 * | 2/2002 | Kniajer et al. | 501/17 |

FOREIGN PATENT DOCUMENTS

| | | |
|---|---|---|
| EP | 1 223 201 | 7/2002 |
| EP | 1 614 664 | 1/2006 |
| WO | WO 2005/019360 | 3/2005 |

OTHER PUBLICATIONS

International Search Report for International Application No. PCT/IL2006/001143 Date of Mailing Apr. 27, 2007.
International Preliminary Report on Patentability. International App. No. PCT/IL2006/001143. Date of Issuance Apr. 1, 2008.

* cited by examiner

*Primary Examiner* — Necholus Ogden, Jr.
(74) *Attorney, Agent, or Firm* — Pearl Cohen Zedek Latzer, LLP

(57) ABSTRACT

The invention relates to an ink-jet ink composition for printing on a ceramic substrate comprising: (a) a liquid vehicle; (b) sub-micron particles of binding composition having a melting point below 6000 C; and (c) sub-micron particles causing an etch-like effect, said sub-micron particles are selected from metal oxide particles, high melting point frit particles, and a combination thereof, said sub-micron particles causing an etch-like effect have a melting point of at least 500 C above the melting point of said sub-micron particles of binding composition. The invention further relates to a printing process using such ink and to a ceramic substrate printed with a pattern or image having an etch-like effect, by means of the printing process.

39 Claims, No Drawings

INK PROVIDING ETCH-LIKE EFFECT FOR PRINTING ON CERAMIC SURFACES

This is a National Phase Application filed under 35 U.S.C. 371 as a national stage of PCT/IL2006/001143, filed Sep. 28, 2006, an application claiming the benefit under 35 U.S.C. 119(e) U.S. Provisional Application No. 60/721,100, filed Sep. 28, 2005, the entire content of each of which is hereby incorporated by reference in its entirety.

FIELD OF THE INVENTION

The present invention concerns ink-jet inks for printing on ceramic surfaces, especially glass.

BACKGROUND OF THE INVENTION

In general, Etch-like effect is referred to an optical effect resulting from non-smooth surface structure and morphology. The original art of Etching is referred to an intaglio method of printmaking in which the image is incised into the surface of a metal plate using an acid. The acid causes etching of predetermined parts of the substrate surface, thus giving a surface with various heights, bringing a unique optical appearance. A similar effect can be achieved by etching glass with suitable chemicals, or by mechanical coarsening of the glass surface, for example by sand blasting.

Commercial product for screen printing for providing etch-like effect on glass surfaces are available, the etch-like effect is achieved by creating a surface roughness, which is obtained by presence of particles having an average particle size above several micron. Such products are also highly viscous, since they contain high concentration of the particles. These two features are suitable for conventional screen printing, however, they are not suitable for ink jet printing.

Ceramic materials are hard, brittle, heat- and corrosion-resistant substrates made by shaping and then heating a non-metallic mineral, such as clay, at a high temperature. Enamels, porcelain, and bricks are examples of materials that are produced by molding or shaping minerals and baking or firing them at high temperatures.

Glass products are typically made by fusing silicates with boric oxide, bismuth oxide aluminum oxide or phosphorus pentoxide at high temperatures. They have highly variable mechanical and optical properties and solidify from the molten state without crystallization into a transparent or translucent form. While glass items are generally hard and brittle, their lack of crystalline structure puts them in the class of amorphous solids. Glass items that may require printed graphics include windows, mirrors, cooking utensils, bottles, containers, and more.

From a printing point of view, several methods are available for decorating glass and ceramics with high-quality images. The printing processes used for glass and ceramic printing rely on a variety of ink systems. Most inks fall into one of two families: organic and inorganic.

Organic inks are typically used in screen, inkjet and pad printing, and consist of organic pigments and resins along with other chemistries that cure over time and rely on temperature or some other form of energy to create a bond with the substrate. The most effective organic inks are produced as two-component or two-part systems. These inks generally contain resins capable of polymerization that are blended with catalysts to initiate polymerization.

Inorganic inks use mineral-based pigments and materials that, once printed, have to be heated and melted at high temperatures in order to combine with the substrate surface and form a permanent bond. However, it is expected that the organic ink components will be burnt out at high temperature.

Ceramic colors, as inorganic ceramic inks are called, are a mixture of pigments (metal oxides and salts) and finely ground glass particles, called frit. These materials are fused to the substrate by calcining ("firing") them at temperatures between 600-1450° C. Firing temperatures vary depending on the make-up of the color, the nature of substrate, and other application criteria, but in all cases the temperatures must be carefully controlled to achieve specific colors after firing.

These high firing temperatures are used as the components of ceramic colors need to be melted so they can fuse to the ceramic surface on which they are printed. While these inks are typically called "inorganic", they may also contain small amounts of organic material. The organic components are the materials in which the pigment and frit are suspended to create a printing ink. These organic materials, which are oily in nature, are designed to burn off rapidly during firing without affecting print quality and final color.

While printing on ceramic surfaces with inorganic inks may be obtained by silk-screen, pad printing or digital printing, commercial ceramic inks are difficult to use in inkjet printing as they have typically a viscosity higher than required for inkjet printing (about 20-40 cP) and the glass frit contained in them, which is in the micron size range, tends to sediment and also clog the nozzles on the orifice plate from which the ink is jetted during inkjet printing.

An ink composition containing pigments, which is liquid at room temperature for printing on a ceramic substrate to be fused to the substrate upon firing is described in WO2005/019360.

There is a widely recognized need for and it would be highly advantageous to have an ink-jet ink composition which is liquid for use in ink-jet printers and which can provide an etch-like effect instead of traditional screen printing compositions.

It would have been highly desirable to use inkjet printing on the ceramic surfaces with ceramic sub-micron particles imparting the Etch-like effect, instead of the currently used methods of silk-screen printing.

The objective of the present invention is to achieve the etch-like effect by digital printing, namely ink jet printing, on ceramic surfaces, mainly glass surfaces while utilizing novel ink jet inks.

Converting to digital printing can have the following advantages: reduction of costs involved with storage of screens or transfer devices due to digital storing of the desired patterns instead of physical storage; reduction of costs for low volume printing which can be prohibitive in silk-screen printing; increase the ease and versatility of switching from one design to another, capacity for edge to edge printing utilization.

SUMMARY OF THE INVENTION

The present invention relates to an ink-jet ink composition for printing on a ceramic substrate comprising:
  (a) a liquid vehicle;
  (b) sub-micron particles of binding composition having a melting point below 600° C.; and
  (c) sub-micron particles causing an etch-like effect, said sub-micron particles are selected from metal oxide particles, high melting point frit particles, and a combination thereof, said sub-micron particles causing an etch-like effect have a melting point of at least 50° C. above the melting point of said sub-micron particles of binding composition.

The present invention additionally relates to a printing process comprising:
(a) incorporating into an ink jet printer an ink-jet ink composition as described in the present invention;
(b) printing said ink composition onto a ceramic substrate;
(c) firing the ceramic substrate at a temperature above the melting point of the sub-micron particles of binding composition and below the melting point of the sub-micron particles causing an etch-like effect yielding a pattern or image with an etch-like effect.

The present invention further relates to a ceramic substrate printed with a pattern or image having an etch-like effect, by means of the printing process described in the present invention.

DETAILED DESCRIPTION OF THE INVENTION

The present invention is based on the finding that it is possible to obtain an etch-like effect on ceramic surfaces by ink jet printer using an ink composition comprising: sub-micron particles of binding composition to be fused to the substrate upon firing; and sub-micron particles capable of causing an etch-like effect (capable of light reflection) selected from metal oxide particles, frit particles (preferably Zn based frits) having a high melting point, and a combination thereof. The ink is capable of becoming an integral part of the substrate upon exposure to temperatures above the melting point of the binding composition; and providing an etch-like pattern or effect after firing the substrate (i.e by exposing the substrate to temperatures above the melting point of the sub-micron particles of binding composition and below the melting point of the sub-micron particles causing an etch-like effect). The ink composition is for use in ink-jet printers. The present invention is further based on the finding that it is possible to obtain an etch-like effect by an ink-jet printing process using such inks, which utilizes a random process of two-dimensional (2D) or three-dimensional (3D) data filtering.

While traditional compositions for silk screen printing utilize particles having a size above micron which assist in obtaining an etch-like effect, in the present invention an etch-like effect was achieved by using sub-micron particles (metal oxide and/or high melting point frit particles) formulated in an ink-jet ink composition comprising a liquid vehicle. Although the particles are in the sub-micron range, an etch-like effect was achieved. The etch like effect is obtained by proper selection of the ink composition which is suitable for ink jet printing, while the exact etch-like appearance can be controlled by the printing mode of the ink jet printer.

Thus, the present invention provides an ink-jet ink composition for printing on a ceramic substrate comprising:
(a) a liquid vehicle;
(b) sub-micron particles of binding composition having a melting point below 600° C.; and
(c) sub-micron particles causing an etch-like effect, said sub-micron particles are selected from metal oxide particles, high melting point frit particles, and a combination thereof, said sub-micron particles causing an etch-like effect have a melting point of at least 50° C. above the melting point of said sub-micron particles of binding composition.

The term "ceramic substrate" refers to a substrate which is comprised of or consists essentially of a ceramic material. The term "ceramic substrate." refers also to inorganic non-metallic substrate processed or used in high temperature. This includes surfaces such as glass for windows of buildings, cars, electrical appliances, such as ovens, etc., ceramic surfaces such as those formed by clay minerals, such as tiles, porcelain enamel and other ceramic material. Typical ceramic materials include, e.g., alumina, silicon carbide, beryllia, and the like. Most preferably, the ceramic substrate is glass.

The ink of the invention is of the type to be fused to the substrate upon firing, so that it becomes an integral part of the substrate, especially glass. The integration is for the purpose of obtaining mechanical & chemical properties of the printed pattern while bringing a "non-colored printed pattern" (opaque or rough pattern) caused by surface roughness due to the ink jet printing mode, and by a different refractive index (i.e. different light reflection) of the sub-micron particles causing the etch-like effect and the ceramic surface and the binding composition (frit binder).

The ink-jet ink comprises a refractive material which are the sub-micron particles causing an etch-like effect. This material functions by causing local changes in the refractive index on the ceramic substrate, thus leading to inhomogeneous reflection of light, which brings the etch-like effect. Such materials have high melting point, and their size should be at the sub-micron range. The use of such particles would be possible if the particles size is below 1 micrometer prior to printing, and it should not cause increase in viscosity above the range which is suitable for ink jet printing, typically below 25 cP.

Integration of the pigment-less ink into a surface to provide a non-colored pattern may be used for example in architecture to provide rough, opaque or "matt" patterns or may be used for example in surfaces on windows or glass doors both for aesthetic purposes and for avoiding accidental collisions.

It should be emphasized that the etch-like printing can either "stand alone" or may be utilized as a background to other colors (black etc.) or as spot color.

Preferably the ink is pigment-less (i.e. does not include a pigment).

Typically, the ink is a stable dispersion of the inorganic sub-micron particles. After it is being printed by an inkjet printer, the glass substrate is brought to a furnace at temperature range preferably of 500-700° C., allowing melting and sintering of the binding composition (low temperature frit), and after most of the organic components are burnt, an etch-like appearance is obtained.

The etch-like effect is provided by the metal oxide particles or high melting point frits, (or a combination thereof) which are refractive materials. Refractive materials have the ability to reflect part of the light. Additionally, the sub-micron particles causing an etch-like effect are characterized by having a refractive index different from that of the ceramic substrate and the ceramic binding composition (thus functioning as refractive materials causing light reflection), therefore providing an etch-like effect. In addition, the mode of placing the droplets on the substrate by the ink jet printer also leads to inhomogeneous surfaces, that contribute to the etch effect.

The binding composition will fuse with the glass to form a layer which becomes part of the glass surface, thus the fused layer will contain dispersed particles (sub-micron particles causing an etch-like effect) which did not completely fuse to the glass, therefore providing an etch-like effect.

The term "binding composition" refers to a composition (may comprise a mixture of several different compounds) which upon firing sinters and fuses to the ceramic (glass) substrate becoming an integral part thereof.

Typically, a binding composition comprises a compound selected from glass frit having a low melting point, i.e. melting point below 600° C.

The glass frit having a low melting point may have a melting point in the range 500-590° C.

According to a preferred embodiment of the present invention the ink is characterized by:
(a) becoming an integral part of the substrate upon exposure to temperatures above the melting point of said binding composition; and (b) providing an etch-like pattern or effect after firing said substrate.

Preferably the exposure is to temperature of 600° C. or below.

According to a preferred embodiment of the present invention the exposure is to temperatures above the melting point of the binding composition, and most preferably to a temperature 600° C. or below (i.e. 600° C. or below but above the melting point of the binding composition).

The ink of the present invention becomes an integral part of the substrate when the substrate and the ink are exposed to temperatures above the melting point of the binding composition preferably above 500° C., more preferably above 550° C., even more preferably above 580° C. Preferably the exposure is to temperatures of 600° C. or below but above the temperatures indicated above. The term "becoming an integral part" means that the ink is sintered, fused or melted to become inseparable from the upper surface of the ceramic-glass substrate, so that it cannot be scratched off upon conventional physical or chemical abrasion tests, it is not separated from the surface upon heating, or exposure to substances such as acid or alkali solutions.

The ink composition is for use in ink-jet printing.

Preferably the vehicle being liquid at a temperature of 15-70° C., more preferably at a temperature of 15-50° C. Preferably the vehicle is liquid at room temperature (20-25° C.).

The vehicle is preferably composed of at least one organic solvent or a combination of organic solvents.

According to a preferred embodiment of the present invention the ink composition has a viscosity of below 50 cP at room temperature.

Additionally, according to a preferred embodiment of the present invention the ink composition has a viscosity below 25 cP at jetting temperature.

Thus the ink composition of the present invention has a viscosity enabling it to be printed by inkjet printing, typically a viscosity (at room temperature) of below 50 cP, or a viscosity at jetting temperature (the temperature present at the ink print head during printing) of below 25 cPs, more preferably below 23cPs, even more preferably below 20 cPs, and most preferably between 15-19 cPs.

The viscosity in the inks described in this invention, is measured by a Brookfield DV-II+viscometer, with small sample adapter, while using spindle S18, at 80 rpm.

The term "jetting temperature" refers to the temperature of the ink at the print head and is typically 20-60° C., preferably 28-45° C.

Moreover according to a preferred embodiment of the present invention, the liquid vehicle is at least one organic solvent.

Further according to a preferred embodiment of the present invention, the at least one organic solvent is selected from PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPnB (tripropylene glycol mono n-butyl ether), PnP (propylene glycol mono propyl ether), DPnP (dipropylene glycol mono propyl ether), TPnB-H (propylene glycol butyl ether), PMA (propylene glycol mono methyl ether acetate), Dowanol DB (Diethylene glycol mono butyl ether), Propylene Glycol diacetate (PGDA), Butyl Glycol Ether, Cyclohexanone, Ethylene Glycol Butyl Ether Acetate, Butanol, propylene glycol diacetate, DPMA (dipropylene glycol methyl ether acetate), dipropylene glycol methyl ether, (DPnPdipropylene glycol n-propyl ether), dipropylene glycol dimethyl ether, ethylacetoacetate or other ethylene or propylene glycol ethers; or a combination of two or more of the above.

Further according to a preferred embodiment of the present invention, the diameter of said sub-micron particles is less than 1 micron. More preferably the diameter of said sub-micron particles is in the range of 100 nm up to less than 1000 nm, more preferably in the range 100-950 nm, and most preferably in the range 100-800 nm.

The above diameter values refer to average particle diameter as measured by volume, determined by dynamic light scattering.

According to a preferred embodiment of the present invention the binding composition having a melting point below 600° C. is a glass frit.

Additionally according to a preferred embodiment of the present invention, the glass frit (i.e. having a melting point below 600° C.) is a Bi containing glass frit.

According to a preferred embodiment of the present invention the binding composition having a melting point below 600° C. is a Bi-containing glass frit.

By the term "Bi containing glass frit" is meant that the glass frit is composed of networks of Si and Bi interrupted by oxygen atoms (for example —O—Si—O—Bi—O—, or other combinations containing different percentages of Si and Bi).

Moreover according to a preferred embodiment of the present invention, said binding composition is a Bi containing glass frit composed of $SiO_2$, $Bi_2O_3$, and $B_2O_3$.

By the term "glass frit composed of $SiO_2$, $Bi_2O_3$, and $B_2O_3$" is meant that the frit is composed of $SiO_2$, $Bi_2O_3$ and $B_2O_3$ which are covalently linked, i.e. forming network of Si, Bi, B interrupted by oxygen atom (for example —O—Si—O—Bi—O—B—O—). It is appreciated that different combinations containing different percentages of Si, Bi, and B are also covered by this term.

Preferably the w/w of the $SiO_2$ in the glass frit is 10-70%. Preferably the w/w of the $Bi_2O_3$ in the glass frit is 10-60%. Preferably the w/w of the $B_2O_3$ in the glass frit is 3-50%.

Besides of main compounds such as $SiO_2$, $Bi_2O_3$, and $B_2O_3$, glass frit can contain $Al_2O_3$ (0.5-9%), $K_2O$ (1-2%), $Na_2O$ (2-14%), CaO (1-7%), BaO (15%), PbO (25-60%), $ZrO_2$ (1-2%), ZnO (2-9%), MgO (0.5-1%), $TiO_2$ (5-10%), F (1-2%). The exact composition of the glass frit is selected according to the required properties, such as sintering temperature, acid and base resistance etc.

Preferably the concentration of the sub-micron binding composition based on the total weight of the ink composition is in the range 20-80%, more preferably in the range 25-70%, and most preferably in the range 30-65%. The sub-micron particles causing an etch-like effect are characterized by having a refractive index different from that of the glass substrate (thus functioning as refractive materials causing light reflection), therefore providing an etch-like effect.

According to a preferred embodiment of the present invention, the metal oxide particles are selected from silica, alumina, ZnO, zirconia, SnO, Sb2O5, PbO, and mixtures thereof.

The metal oxide particles causing an etch-like effect refer to non-coloured metal oxides.

Preferably the concentration of the metal oxide particles based on the total weight of the ink composition is in the range 0.1-5% w/w. More preferably the concentration of said metal oxide particles is in the range 0.1 to 3% w/w. Most preferably the concentration of said metal oxide particles is in the range 0.2 to 2%.

According to a preferred embodiment of the present invention, the high melting point frit particles are selected from Zn containing glass frit.

Further according to a preferred embodiment of the present invention, the high melting point frit particles are selected from Zn containing glass frit, composed of $SiO_2$, ZnO, and $B_2O_3$.

By the term "Zn containing glass frit composed of $SiO_2$, ZnO, and $B_2O_3$" is meant that the frit is composed of $SiO_2$, ZnO and $B_2O_3$ which are covalently linked, i.e. forming network of Si, Zn, B interrupted by oxygen atom (for example —O—Si—O—Zn—O—B—). It is appreciated that different combinations containing different percentages of Si, Zn, and B are also covered by this term.

According to a preferred embodiment of the present invention, the w/w concentration of the $SiO_2$ in the glass frit is 10-50%.

Additionally according to a preferred embodiment of the present invention, the w/w concentration of the ZnO in the glass frit is 10-30%.

Further according to a preferred embodiment of the present invention, the w/w concentration of the $B_2O_3$ in the glass frit is 3-50%.

According to a preferred embodiment of the present invention, the melting point of said high melting point frit particles is above 600° C.

According to another preferred embodiment of the present invention, the melting point of said high melting point frit particles is above 650° C.

According to an additional preferred embodiment of the present invention, the melting point of said high melting point frit particles is above 700° C.

According to a further preferred embodiment of the present invention, the melting point of said high melting point frit particles is above 850° C.

Preferably the melting point of said high melting point frit particles is above the values indicated above and up to 1200° C. The melting point of said high melting point frit may be in the range 600° C.-1200° C. or preferably in the range 650° C.-1200° C. The melting point of said high melting point frit may be in the range 850° C.-1200° C.

The melting point temperatures of the metal oxide particles (or metal oxides in combination with high melting point frits) may be as indicated above for the high melting point frit.

Preferably the concentration of the high melting point sub-micron particles (i.e. high melting point frit particles) causing an etch-like effect based on the total weight of the ink composition is in the range 5-25% (w/w), more preferably in the range 7-22% (w/w), and most preferably in the range 10-20% (w/w).

The weight ratios between the binding composition (e.g. Bi containing glass frit (low melting point frit)) and of a high melting point frit (e.g. Zn containing glass frit) may be 50:50-95.5:4.5. The preferred weight ratios are 60:40-90:10. The more preferred weight ratios are 80:20-90:10.

The weight ratios between the particles causing etch effect (metal oxide) and binding composition (e.g. Bi containing glass frit) may be in the range 0.1:99.9-0.8:99.2 The preferred weight ratios are 0.2:99.8-0.8:99.2. The more preferred weight ratios are 0.5:99.5-0.8:99.2.

The weight ratios between the particles causing etch effect (metal oxide) and frit contents (both the low melting point Bi based frit and the high melting point Zn based frit) may be in the range 0.1:99.9-0.8:99.2. The preferred weight ratios are 0.2:99.8-0.8:99.2. The more preferred weight ratios are 0.5:99.5-0.8:99.2%. The above ratios refers to the case where the weight ratios between the Bi containing glass frit and the Zn containing glass frit are preferably in the range 80:20-90:10.

According to a preferred embodiment of the present invention the sub-micron particles causing an etch-like effect are high melting point frit particles (as described in the present invention).

According to another preferred embodiment of the present invention the sub-micron particles causing an etch-like effect are metal oxide particles (as described in the present invention).

According to a preferred embodiment of the present invention, the ceramic substrate is glass.

The ink compositions of the present invention may further comprise an organic polymeric binder.

Preferably the organic polymeric binder is selected from acrylic resins, carboxylated acrylic resins, polyvynilpyrrolidone, polyvinylbutyral, condensate of urea and aldehydes, polyvinyl resins, cellulose acetate butyrate, and mixtures thereof.

The ink may further comprise at least one UV-curable agent. Many times it is desired to fix the ink to the substrate, before the firing so as to improve the printing properties. Addition of UV curable agents enables rapid fixation of the printed etch-like pattern by exposing the surface-bearing ink droplets to UV radiation, after printing. Since the UV curable agents are organic molecules, they are burnt out during the firing of the printed glass pattern.

The term "UV-curable agent" refers to a composition that can polymerize upon application of UV irradiation. Typically these are photo-polymerizable monomers or oligomers, together with photoinitiators and/or photosensitizers.

According to a preferred embodiment of the present invention, the liquid vehicle consists essentially at least one UV-curable agent. According to this embodiment the UV-curable agent functions as the liquid vehicle of the ink composition.

According to another preferred embodiment of the present invention, the ink composition further comprising at least one UV-curable agent.

Preferably the ink curable agent is selected from photo-polymerizable monomers and photo-polymerizable oligomers.

Moreover according to a preferred embodiment of the present invention, the ink composition further comprising at least one of: photoinitiators, or photosensitizers.

At the present invention, the UV curable composition (monomers, oligomers, photoinitiators, photosensitizers) may be added to the ink described above, thus imparting a partial UV curing capability for the ink, which is sufficient to cause fixation of the printed droplets, immediately after exposure to UV light. (or alternatively the liquid vehicle is composed of UV-curable composition).

Such additives, which can be polymerized upon exposure to UV light, may be for example: acrylic or vinyl monomer.

UV polymerizable ink compositions are obtained by mixing one ore more of the following: monomers, oligomers, Photo-initiators, oxygen scavengers which are selected from but are not limited to the list below:

Acrylic or vinyl monomer, oligomer and oxygen scavengers: which can be obtained from Sartomer Company for example: SR-504 (Ethoxylated (4) Nonyl Phenol Acrylate), SR-355 (Ditrimethylolpropane Tetra Acrylate), SR-454 (Ethoxylated (3) Trimethylolpropane Triacrylate), SR-9036 (Ethoxylated (30) Bisphenol Dimethacrylate), SR-399 (Dipentaerythritol Pentaacrylate), SR-9016 (Metallic Diacrylate), SR-351 (Trimethylolpropane Triacrylate), SR-423 (Isobornyl Methacrylate), CN-550 (Methoxy Polyethylene Glycol (350) Monomethacrylate), CN381 (Copolymerisable Amine Acrylate), CN341 (Acrylated Amine Synergist), CN922 (odified Aliphatic Urethane Triacrylate), SR-252 (Polyethylene Glycol (600) Dimethacrylate), SR-203 (Tetrahydrofurfuryl Methacrylate), CN111 (Epoxidized Soy Bean Oil Acrylate), CN131 (Low Viscosity Acrylic Oligomer), CN-133 (Low Viscosity Triacrylate Oligomer), CN386 (Reactive Amine Coinitiator), CN371 (Reactive Amine Coinitiator), and Photo-initiators and photosensitizers: which can be obtained from Ciba Company, for example: Darocur-4265 (50% 2-Hydroxy-2-methyl-1-phenyl-1-propanone and 50% Diphenyl (2,4,6-trimethylbenzoyl)-Phosphine (MAPO) phosphine oxide), Darocur TPO (Diphenyl (2,4,6-trimethylbenzoyl)-Phosphine (MAPO) phosphine oxide), Irgacure-907 (2-Methyl-1-[4-(methylthio) phenyl]-2-(4-morpholinyl)l-propanone), Darocur EDB (ethyl-4(dimethylamino)-benzoate, Irgacure-369 (Benzyl-2-(dimethylamino)-1-[4-(4 morpholinyl)phenyl]-1-butanone, Irgacure-184 (1-Hydroxy-cyclohexyl-phenyl-ketone), Irgacure-819 (Phosphine oxide, phenyl bis 1-(2,4,6-trimethyl benzoyl) (Ciba, Basel), Irgacure-651, Irgacure 2959 (1-[4-(2-Hydrohyethoxy)-phenyl]-2-hydroxy-2-methyl-1-propane-one), Irgacure 250 (Iodonium, (4-methylphenyl)-[4-(2-methylprophyl]-hexafluorophosphate(1-), Irgacure-784 (Bis(5-2,4-cyclopentadien-1-yl)-bis(2,6-difluoro-3-(1H-pyrrol-1-yl)-phenyl) titanium, Irgacure-651 (2,2-Dimethoxy-1,2-diphenylethan-1-one), and 2,2-Dimethyl-2-phenyl acetophenone, Speedcure ITX (Isopropyl-9H-thioxanthen-9-one, 97%, mixture of 2- and 4-isomers), which can be obtained from Sigma Company, UV polymerizable ink compositions can also contain UV stabilizers selected from: Hydroquinone, Methylhydroquinone, Hydroquinone bis(2-hydroxyethylen)ether, Butylated hydroxyanisole or dihydroquinone monomethyl ether, which can be obtained from Sigma Company.

Preferably, the ink composition of the present invention further comprises at least one dispersant or/and wetting agent, such as:

Bykumen (solution of a lower molecular weight unsaturated acidic polycarboxylic acid polyester and White spirit/Isobutanol=2/1), Disperbyk-166 (solution of a high molecular weight block copolymer with pigment affinic groups and Methoxypropylacetate/Butylacetate=1/4), Disperbyk-164 (solution of a high molecular weight block copolymer with pigment affinic groups and Butylacetate), Disperbyk-130 (solution of polyamine amides of unsaturated polycarboxylic acids and Alkylbenzene/Butylglycol=5/1), Disperbyk-182 (solution of a high molecular weight block copolymer with pigment affinic groups and Methoxypropylacetate/Methoxy-proppoxypropanol/Butylacetate=4/4/4), Disperbyk-163 (solution of high molecular weight block copolymer with pigment affinic groups, in xylene/butyl/acetate/methoxypropylacetate 3/1/1);

Disperbyk-161 (solution of a high molecular weight block copolymer with pigment affinic groups and Methoxypropylacetate/Butylacetate=6/1), Disperbyk-101 (Solution of a salt of long chain polyamine amides, polar acidic esters and Mineral spirit/Butylglycol=8/1), Disperbyk-160 (solution of a high molecular weight block copolymer with pigment affinic groups and Xylene/Butylacetate=6/1), BYK-P-104 (solution of a lower molecular weight unsaturated polycarboxylic acid polymer and Xylene/Diisobutylketone=9/1), BYK-P-104 S (solution of a lower molecular weight unsaturated polycarboxylic acid polymer with a polysiloxane copolymer and Xylene/Diisobutylketone=9/1), Disperbyk-180 (Alkylolammonium salt of a block copolymer with acidic groups), Disperbyk-110 (solution of a copolymer with acidic groups and Methoxypropyl acetate/Alkylbenzene=1/1), BYK-W 996 (Solution of a copolymer with acidic groups), BYK-W 9010 (Copolymer with acidic groups), Anti-Terra U (solutions of a salt of unsaturated polyamine amides, lower molecular weight acid polymer and Xylene/isobutanol-8/1), Anti-Terra U 100 (Salt of unsaturated polyamine amides and lower molecular weight acid esters), Disperbyk-111 (copolymer with acidic groups), Disperbyk-2050 (Acrylate copolymer with pigment affinic groups and Methoxypropylacetate), Disperbyk-102 (Copolymer with acidic groups), BYK-410 (Solution of a modified urea and n-Methylpyrrolidone), BYK-348 (polyether modified poly-dimethylsiloxane), BYK-346 (solution of a polyether modified poly-dimethylsiloxane in Dipropyleneglycol monomethylether), BYK-381 (solution of an polyacrylic copolymer and dipropyleneglycol-monomethylether), BYK-306 (solution of a polyether modified poly-dimethylsiloxane and xylene/monophenylglycol+7/2), BYK-358 (solution of polyacrylate copolymer and alkyl benzenes), BYK-333 (polyether modified poly-dimethyl-siloxane) (BYK-Chemie, Germany), Tego Dispers 650 (special modified polyether with pigment affinic groups), Tego Dispers 652 (concentrate of a fatty acid derivative), Tego Dispers 710 (solution of a basic urethane copolymer), Tego Dispers 655 (specially modified polyether with pigment affinic groups)

Tego Dispers 700. (solution of surface active basic and acidic fatty acid derivative in xylene) (Degussa, Germany), K-Sperse XD -A504 (polymeric dispersant), K-Sperse XD -A503 (polymeric dispersant and n-Butyl Acetate), K-Sperse 152 (Zinc Alkylarylsulfonate and Ethylene glycol monobutyl ether) (King Inductries, USA), Solsperse 39000, Solsperse 32000, Solsperse 24000 (polymeric dispersants) (Avecia, UK).

Efka 7500 (aliphatic polyether with acidic groups),

Efka 4015 (modified polyurethane polymeric dispersant),

Efka 7544 (Unsaturated polar esters & amines) (Ciba, Swiss),

Texaphor 3250 Carboxyl functional polymer in organic solvent (solvesso 150-PMA)

Texaphor P-60 (polymeric dispersant) Polyurethane with surface-active properties in xylene/butyl acetate Texaphor P-61 modified polyurethane-block polymer in MPA:Butyl acetate (6:1) (Cognis, Holland)

The dispersant may be a mixture of any of the above dispersants.

The "Disperbyk" dispersant series, the "BYK" dispersant series, the "Anti-Terra" dispersant series are obtained from BYK-Chemie, Germany.

The "Tego Dispers" dispersant series is obtained from, Degussa, Germany.

The "K-Sperse" dispersant series is obtained from King Industries, USA.

The "Solsperse" dispersant series is obtained from Avecia, UK.

The "Efka" dispersant series is obtained from Ciba, Swiss.

The "Texaphor" dispersant series is obtained from Cognis, Holland.

Preferably the dispersants are selected from: Bykumen, Anti-Terra U, Anti-Terra U 100, K-Sperse XD-A504, Tego 652, Tego 655, Efka 7500, Efka 7544, Texaphor 3250, Texaphor P61, Solsperse 32500. Most preferably the dispersants are selected from: Efka 7500, Efka 7544, Texaphor 3250, Texaphor P61 and mixtures of any of the above.

Further according to a preferred embodiment of the present invention, the ink composition further comprising at least one additive.

Preferably the additive is selected from:. wetting agents, dispersing agents, defoamers, humectants, rheology control agents, anticorrosive agents, evaporation control agents, organic polymers as binders and fixation agents (which provide "green strength" such as polyacrylates, polyvinylbutyrals, condensate of urea and aldehydes, polyvinyl resins, cellulose acetate butyrate or polyvinylpyrrolidone (PVP)). The additive may be a mixture of any of the above.

For example, such commercial polymers are: "Pioloform"—polyvinyl butyral ("Wacker", Germany), "Surcol"—carboxylated acrylic copolymer ("Ciba", England), "Paraloid"—acrylic polymer ("Rohm Haas", Germany), "Laroflex"—polyvinyl chloride (Basf, Germany), "PVP"—polyvinyl pyrrolidone ("Sigma", USA), "Butvar"—polyvinyl butyral ("Solutia", USA), "Joncryl resins"—polyacrylates ("Johnson Polymer", The Netherlands).

The invention further relates to a printing process comprising:
 (a) incorporating into an ink jet printer an ink composition as described in the present invention;
 (b) printing said ink composition onto a ceramic substrate;
 (c) firing the ceramic substrate at a temperature above the melting point of the sub-micron particles of binding composition and below the melting point of the sub-micron particles causing an etch-like effect yielding a pattern or image with an etch-like effect.

Preferably said firing is at a temperature of 600° C. or below.

According to a preferred embodiment of the present invention the printing process comprising printing drops of variable numbers at a specific location on the ceramic substrate resulting in a uniform or non-uniform distribution of the ink composition drops on the ceramic substrate.

Preferably the variable numbers are the same or different for each location on the substrate. Printing drops of the same number at each specific location on the ceramic substrate will result in a uniform distribution.

According to a preferred embodiment of the present invention the printing process comprising utilizing a random process of two-Dimensional or three-Dimensional data filtering to obtain an etch-like effect.

Thus, the etch like effect may also be obtained by proper selection of the printing mode, namely by creating surface roughness by printing dots at variable numbers at specific locations on the substrate, thus resulting in dots having variable heights, which causes a surface roughness.

The combination of etch-like ink formulations and suitable printing algorithm brings to the unique etch-like appearance on glass surface.

In general, the Etch-like printing may be controlled by proper software algorithms. Etch like appearance may be achieved by wide format digital printer for ceramic substrates using data manipulation. The basic concept of data manipulation that gives the etch-like appearance may be a 2D or 3D data filtering:

1. The 2D filtering controls the opacity of the etch-like appearance.
2. The 3D filtering control the matt/gloss of the etch-like appearance.
   a. This feature controls the min & max thickness of the etch printing
   b. By random algorithm it also controls the shape (tops and lows) of the 3D printing to eliminate repetitive pattern of the printing and therefore control the light scattering from the printed surface. This is possible by manipulating the number of drops per dot of the printed image. The 3D printing algorithm controls the roughness of the printed image and the light scattering from the printed surface (etch effect).
   c. optional Algorithm—
      a. One of the 3D filters is built by using multiply copies (layers) of the original image and using the 2D filter for each layer with pre define or random filtering parameter for this layer.
      b. The number of copied layers is a parameter of the 3D filter that affect the maximum dots that can be placed (printed) one on top of the other
      c. The filtering parameter means—the percentage of dots (from the original layer) exist in the copied layer.
      d. all layers are merged (with the different filtering parameter) to a final printed file.

By this concept we get different and random printed surface thickness (opacity), for each position in the printed area.
 For example, by making 4 duplicate layers from the original file and give the four layers (100%, 75%, 50%, 25%) pre define filtering parameter (opacity level) and than merge the four files, we get randomly positions with (1 dot height, 2 dot height, 3 dot height, 4 dots height) opacity level.
 In the same concept we can make file with any number of layers (eighth, ten and more) and much more opacity level combination.

The invention additionally relates to a ceramic substrate printed with a pattern or image having an etch-like effect, by means of the printing process described in the present invention.

EXAMPLES

Example 1

General Preparation of Etch-Like Inkjet Inks

I. Preparation of Etch based on Bi containing frit+metal oxide (refractive material)
A. Polymer Dissolution
1. All solvents, dispersant and wetting agent were mixed for 5 minutes after which slow addition of polymer was performed; Total polymer dissolution is carried out by heating to 35° C., taking care not to exceed this temperature.

B. Frit Addition

1. The dissolved polymer solution is being transferred into a high shear mixer (Dispermat—HSIANGTAI, Model-DC-CH700) mounted with Disc impeller, while stirring at a low shear.
2. A stepwise addition of frit is being carried out while increasing mixer shear rate in order to insure efficient mixing process.
3. Slow addition of metal oxide while continuing mixing is being preformed
4. The mixture is then transferred to a bead mill (0.5-0.7 mm beads size), milled for 1-3 hr. according to the batch size.

The following experimental conditions apply—according to the batch volume—
I. 10 kg batch—2500 rpm, 3 hr.
II. 2 kg batch—3000 rpm, 1 hr.
III. 0.5 kg batch—3000 rpm, ½ hr.

B. Preparation of Etch based on Bi-containing frit and Zn-containing frit

A. Polymer Dissolution

1. All solvents, dispersant and wetting agent were mixed for 5 minutes after which slow addition of polymer was preformed; Total polymer dissolution is carried out by heating to 35 C, taking care not to exceed this temperature.

B. Frit Addition

1. The dissolved polymer solution is being transferred into a high shear mixer (Dispermat—HSIANGTAI, Model-DC-CH700) mounted with Disc impeller, while stirring at a low shear.
2. A stepwise addition of Bi-containing frit is being carried out while increasing mixer shear rate in order to insure efficient mixing process.
3. A slow addition of Zn-containing frit is being preformed while mixing.

The following experimental conditions apply, according to the batch volume—
I. 10 kg batch—2500 rpm, 3 hr.
II. 2 kg batch—3000 rpm, 1 hr.
III. 0.5 kg batch—3000 rpm, ½ hr.

The resulting ink was filtered through 1-micrometer filter (Cefar, Switzerland). There was no significant change to the solid content of the ink formulation and no clogging of the filter was observed.

For initial testing of the viscosity and contents of the ink formulations, samples of the ink formulation were applied on glass as 6, 12, 24, 40 or 60 μm coatings by K-Hand coater (Applicat LTD) and dried in a furnace at 580-650° C. during 10 min. Further tests were performed by jetting the ink at temperatures of 25° C., 30° C., 35° C., 45° C. or 55° C.

The exact composition and properties of ink jet inks are presented in the following table.

TABLE 1

| Formulation | Composition (% W) | Solids, % | Viscosity, cP |
|---|---|---|---|
| Formulation 1 | Frit PJ-5337F* - 6.94 (high mp.)<br>Frit JFC001** - 54.70 (low mp.)<br>Cyclohexanone - 10.00<br>PGDA - 5.00<br>Dowanol DB - 5.00<br>DPM - 14.29<br>Efka 7500 - 1.5<br>BYK 358 - 0.57<br>Iso-Butanol - 1.00<br>Paraloid B-66 (acrylic polymer) - 1.00 | 45.07 | 15.0 (at 25° C.) |
| Formulation 2 | Frit JFC001 - 59.76 (low mp.)<br>Cyclohexanone - 9.96<br>Dowanol DB - 4.98<br>DPM - 16.16<br>PGDA - 4.98<br>Efka 7500 - 0.25<br>Bykumen - 1.99<br>BYK 358 - 0.57<br>Paraloid B-66 - 0.95<br>Aerosil R972$^{(a)}$ (Silica particles) - 0.40 | 43.37 | 20.5 (at 25° C.) |
| Formulation 3 | Frit PJSP83-1F**** - 21.41 (high mp.)<br>Frit PJ5405F*** - 46.28 (low mp.)<br>Ethanol - 14.98<br>Dowanol DB - 3.50<br>DPM - 12.81<br>Bykumen - 2.52<br>BYK 358 - 0.50<br>Paraloid B-66 - 1.0 | 48.10 | 20.5 (at 35° C.) |
| Formulation 4 | Frit PJSP83-1F - 21.41 (high mp.)<br>Frit PJ5405F - 46.28 (low mp.)<br>Cyclohexanone - 11.98<br>Dowanol DB - 3.04<br>DPM - 12.81<br>Bykumen - 2.52<br>BYK 358 - 0.50<br>Paraloid B-66 - 1.00<br>Aerosil R812S$^{(a)}$ (silica particles) - 0.46 | 48.10 | 18.9 (at 35° C.) |
| Formulation 5 | Frit PJSP83-1F - 10.18 (high mp.)<br>Frit PJ5405F - 38.34 (low mp.)<br>Cyclohexanone - 17.02<br>Dowanol DB - 4.25<br>DPM - 15.89<br>Propylene glycol diacetate - 7.95<br>Bykumen - 3.57<br>BYK 333 - 1.42<br>Paraloid B-66 - 0.98<br>Aerosil R972$^{(a)}$ (silica particles) - 0.38 | 34.30 | 11.3 (at 35° C.) |

TABLE 1-continued

| Formulation | Composition (% W) | Solids, % | Viscosity, cP |
|---|---|---|---|
| Formulation 6 | Frit PJ5337F - 13.88 (high mp.)<br>Frit PJ5405F - 54.74 (low mp.)<br>Cyclohexanone - 11.00<br>Propylene glycol diacetate - 5.00<br>Dowanol DB - 5.00<br>DPM - 6.10<br>Efka 7500 - 0.75<br>Bykumen - 2.00<br>BYK 358 - 0.57<br>Paraloid B-66 - 1.00 | 49.86 | 19.8 (at 25° C.) |
| Formulation 7 | Frit PJ5337F - 34.00 (high mp.)<br>Frit PJ5405F - 34.00 (low mp.)<br>Cyclohexanone - 10.00<br>Propylene glycol diacetate - 5.00<br>Dowanol DB - 5.00<br>DPM - 6.93<br>Efka 7500 - 1.50<br>Bykumen - 2.00<br>BYK 358 - 0.57<br>Paraloid B-66 - 1.00 | 49.74 | 20.0 (at 25° C.) |
| Formulation 8 | Frit PJ5337F - 20.40 (high mp.)<br>Frit JFC001 - 47.60 (low mp.)<br>Cyclohexanone - 10.00<br>Propylene glycol diacetate - 5.00<br>Dowanol DB - 5.00<br>DPM - 6.93<br>Efka 7500 - 1.50<br>Bykumen - 2.00<br>BYK 358 - 0.57<br>Paraloid B-66 - 1.00 | 49.52 | 19.0 (at 25° C.) |
| Formulation 9 | Frit PJ5337F - 13.88 (high mp.)<br>Frit JFC001- 54.74 (low mp.)<br>Cyclohexanone - 10.00<br>Propylene glycol diacetate - 5.00<br>Dowanol DB - 5.00<br>DPM - 7.35<br>Efka 7500 - 1.50<br>BYK 358 - 0.57<br>Paraloid B-66 - 1.00<br>Isobutanol - 1.50 | 49.77 | 15.0 (at 25° C.) |

*PJ-5337F- High melting point Zn based Li free frit for Etch enamels (72.58%, particle size-800-950 nm).
**JFC001- Bi based frits (73.18% solids, particle size 508-880 nm).
***PJ5405F- Bi based frits (70.43% solids, particle size 439-890 nm).
****PJSP83-1F- High melting point Zn-containing frit (67.36% solids, particle size 488-713 nm).

The above frits were obtained from Johnson Matthey, Holland.
(a) Aerosil R972 and Aerosil R812S refer to hydrophobic sub-micron silica particles ((average particles size is 200 nm), which was obtained from "Degussa", Germany.

A composition comprised of bi-component frits (formulation 6) was printed on glass and produced an Etch-like pattern. The Frits composition employed contained mainly a low melting point frit and some high melting point frit (weight ratio 8:2). An additional difference as compared to the following two Etch imitation formulations (formulations 7 and 8) is the presence of a lower dispersants amount. The formulation was printed by Glassjet printing machine. Printing parameters −90V, 7m/sec, 25° C., super -high mode, Tin side. Etch-like structure was obtained by firing at 600° C.

A composition comprised of bi-component frits composition (formulation 7) was printed on glass and produced an Etch-like pattern. The Frits composition employed contained an equal ratio of both low melting point frit and high melting point frit (weight ratio 1:1). Identical dispersant's amount to those present in the following formulation (i.e., Formulation 8) was employed. The formulation was printed by Glassjet printing machine. Printing parameters −100V, 7 m/sec, 27° C., super -high mode, Tin side. Etch-like structure was obtained by firing at 600° C.

A composition comprised of a bi-component frit composition (formulation 8) was printed on glass and produced an Etch-like pattern. The Frits composition employed contained mainly a low melting point frit and some high melting point frit (weight ratio 7:3). Percent of employed dispersants is identical to those of Formulation 7. The formulation was printed by Glassjet printing machine. Printing parameters −90V, 7 m/sec, 27° C., super-high mode, Air side. Etch-like structure was obtained by firing at 600° C.

A composition comprised of bi-component frits composition (formulation 9) was printed on glass and produced an Etch-like pattern. The Frits composition employed contained mainly a low melting point frit and some high melting point frit (weight ratio 8:2). The formulation was printed by Glassjet printing machine. Printing parameters −90V, 7 m/sec, 26° C., Unidirectional printing mode, Tin side. Etch-like structure was obtained by firing at 600° C. The photo was taken on a black background beneath the glass.

4 experiments were performed for each formulation tested. For each experiment different two dimensional filter was used (providing the same ink thickness over the whole printed area in the same experiment). The different two dimensional filter was used to examine how it affects the opacity of the etch-like printing.

The different two dimensional filters produced 2, 3, 4 or 5. printed drops in each position of the glass substrate.

The best result (etch-like effect) was achieved using two dimensional filter producing 2 printed drops in each position on the glass substrate. The best frit combination is 8:2 (formulation 6).

Effect of Shear Rate on Viscosity

Addition of rheology control agent such as polymers may result in appearance of pseudo-plastic behavior of the etch-like ink composition. For this kind of formulations the viscosity is high at low shear rate (which is relevant to sedimentation of particles in dispersions, and to drops fixation on glass substrate) and is reduced with the increase of shear rate (relevant to ink jetting process). Usually, at very high shear rates, the viscosity remains constant.

Rheological data for Formulation 9 is presented in Table 2 below (at 25° C.).

TABLE 2

| Shear rate [1/s] | viscosity [cP] |
|---|---|
| 0.0066 | 1030 |
| 0.112 | 550 |
| 0.217 | 420 |
| 0.322 | 310 |
| 0.426 | 250 |
| 0.532 | 200 |
| 0.742 | 150 |
| 1.058 | 120 |
| 1.475 | 89.5 |
| 1.789 | 76.6 |
| 2.000 | 70.4 |
| 4.414 | 59.1 |
| 8.821 | 40.2 |
| 17.63 | 30.1 |
| 28.65 | 25.4 |
| 39.66 | 23.0 |
| 50.68 | 21.6 |
| 61.7 | 20.5 |
| 66.1 | 20.2 |
| 70.51 | 19.9 |

Example 2

UV-Etch-Like Inkjet Ink Formulations Containing UV-Curable Agents

The etch-like ink formulation of the invention may contain monomers, oligomers and photo-initiators imparting rapid fixation after printing, when exposing the printed image to UV radiation. These UV polymerizable components are added to the etch-like ink formulation as described below. This ink formulation thus may contain only the slow evaporating solvents (since the fixation will be achieved by the UV radiation. One of the problems of printing on glass is drop spreading on the glass substrate. Combination of slow evaporating and fast evaporating solvents can solve the problem. However, the use of fast evaporation solvent usually causes maintenance problems, due to drying on the printhead. In the case of ink preparation with TV-curable agent, exposing of printed drops to UV radiation prevents the ink spreading on the substrate, thus eliminating the need of using fast evaporating solvents.

In regular UV ink all composition is polymerised by UV exposure and converts to "solid". In the UV-etch-like ink formulations of the present invention the UV polymerizable components preferably compose only as a small fraction of entire liquid vehicle. This small fraction of UV polymerizable materials, causes the required initial drop fixation on the substrate, after exposure to TV light. During firing, all the organic components, including the polymerizable components, are burnt off.

Alternatively, the ink vehicle may be composed almost entirely (or entirely) of the UV monomers and UV polymerizable materials and upon firing at high temperature, all of the organic components are burnt out, leaving a porous structure imparting an etch-like effect.

Procedure for the Preparation of UV-Etch-Like Ink Formulation:

Procedure Option 1:

The monomer and the photo-initiators were added directly to the etch-like ink as prepared above in Example 1. The mixture was mechanically stirred until full dissolution was obtained. Slight heating may be applied for dissolution acceleration.

Procedure Option 2:

The monomers, oligomers and photo-initiators were added to the solvents (liquid vehicle) of the ink and mechanically stirred until full additives dissolution (or alternatively the above additives are used as the liquid vehicle). The frits and dispersant were added and mixed by Dispermat for 5 min after each material addition. Solvents containing the UV additives were then added, and stirred again by Dispermat (30 min, 9000 rpm).

The resulting inks were filtered through 1-micrometer filter. There was no significant change to the solid content of the ink formulation and no clogging of the filter was observed.

For initial testing, the samples were applied on glass as 5 µl drop and immediately exposed to UV light (Cure spot, Adas Technologies) for 1-20 seconds thus causing rapid fixation of the drop on the glass substrate. The final firing was carried out in a furnace at 580-650° C. during 10 min. Further tests were performed by jetting the ink at temperatures of 25° C., 30° C., 35° C. or 45° C., in which the inks viscosities are about 10-25 cP.

The exact composition and properties of ink jet inks are presented in the following table.

TABLE 3

Specific formulations of UV-Etch-like inks

| Formulation | Composition (% W) | % Solids | Viscosity, cP |
|---|---|---|---|
| Formulation 10 | Frit PJ-5337F - 12.56 (high mp.)<br>Frit JFC001- 49.50 (low mp.)<br>Cyclohexanone - 9.05<br>Dowanol DB - 4.52<br>DPM - 6.66<br>Propylene glycol diacetate - 4.52<br>Efka-7500 - 1.36<br>BYK 358 - 0.51<br>Paraloid B-66 - 0.91<br>Isobutanol - 0.91<br>Darocur TPO - 2.50 (photo-initiator)<br>Speedcure ITX - 1.00 (photo-initiator)<br>CN-550 - 6.00 (monomer) | 38.18 | 17.4 (at 35° C.) |
| Formulation 11 | Frit PJ-5337F - 5.50 (high mp.)<br>Frit JFC001- 21.69 (low mp.)<br>Dowanol DB - 17.01<br>DPM - 16.25<br>Efka-7500 - 2.77<br>BYK 358 - 0.54<br>Paraloid B-66 - 0.82<br>Irgacure-819 - 2.99 (photo-initiator)<br>Speedcure ITX - 2.01 (photo-initiator)<br>SR-355 - 2.99 (monomer) | 40.0 | 25.0 (at 35° C.) |

For preparation of UV polymerizable Etch like ink the bi-component frits composition was used. The Frits composition containing a low melting point frit and high melting point frit (weight ratio 8:2) was applied on glass as 6, 12, 24, 40 or 60 µm coatings by K-Hand coater (Applicat LTD). The applied patterns were exposed to UV light and fired in a furnace at 600° C. during 10 min. The best results were obtained for 6 and 12 µm coatings.

While this invention has been shown and described with reference to preferred embodiments thereof, it will be understood by those skilled in the art that many alternatives, modifications and variations may be made thereto without departing from the spirit and scope of the invention. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

The invention claimed is:

1. An ink-jet ink composition for printing on a ceramic substrate comprising:
   (a) a liquid vehicle;
   (b) a first glass frit of sub-micron particles comprising $Bi_2O_3$ as a binding composition having a melting point below 600° C.; and
   (c) a second glass frit of sub-micron particles comprising $SiO_2$, ZnO, and $B_2O_3$ to cause an etch-like appearance on the ceramic substrate, wherein the second glass frit has a melting point of at least 50° C. above the melting point of said first glass frit,
wherein the ink composition is pigment-less.

2. The ink-jet ink composition of claim 1 characterized by:
   (a) becoming an integral part of the substrate upon exposure to temperatures above the melting point of said binding composition; and (b) providing an etch-like pattern or effect after firing said substrate.

3. The ink-jet ink composition of claim 2 wherein said exposure is to temperatures of 600° C. or below.

4. The ink-jet ink composition of claim 1 for use in ink-jet printing.

5. The ink-jet ink composition of claim 1 having a viscosity of below 50 cP at room temperature.

6. The ink-jet ink composition of claim 1 having a viscosity below 25 cP at jetting temperature.

7. The ink-jet ink composition of claim 1 wherein said liquid vehicle is at least one organic solvent.

8. The ink-jet ink composition of claim 7 wherein the at least one organic solvent is selected from PM (propylene glycol mono methyl ether), DPM (dipropylene glycol mono methyl ether), TPM (tripropylene glycol mono methyl ether), PnB (propylene glycol mono n-butyl ether), DPnB (dipropylene glycol mono butyl ether), TPnB (tripropylene glycol mono n-butyl ether), PnP (propylene glycol mono propyl ether), DPnP (dipropylene glycol mono propyl ether), PMA (propylene glycol mono methyl ether acetate), Dowanol DB (Diethylene glycol mono butyl ether), Propylene Glycol diacetate, Butyl Glycol Ether, Cyclohexanone, Ethylene Glycol Butyl Ether Acetate, Butanol, propylene glycol diacetate, DPMA (dipropylene glycol methyl ether acetate), dipropylene glycol methyl ether, (DPnPdipropylene glycol n-propyl ether), dipropylene glycol dimethyl ether, ethylacetoacetate or other ethylene or propylene glycol ethers; or a combination of two or more of the above.

9. The ink-jet ink composition of claim 1 wherein the diameter of said sub-micron particles is less than 1 micron.

10. The ink-jet ink composition of claim 1 wherein said binding composition having a melting point below 600° C. is a Bi-containing glass frit.

11. The ink-jet ink composition of claim 1 wherein said binding composition is a Bi-containing glass frit composed of $SiO_2$, $Bi_2O_3$, and $B_2O_3$.

12. The ink-jet ink composition of claim 11 wherein the w/w of the $SiO_2$ in the glass frit is 10-70%.

13. The ink-jet ink composition of claim 11 wherein the w/w of the $Bi_2O_3$ in the glass frit is 10-60%.

14. The ink-jet ink composition of claim 11 wherein the w/w of the $B_2O_3$ in the glass frit is 3-50%.

15. The ink-jet ink composition of claim 1, further comprising non-colored metal oxide particles and wherein said metal oxide particles are selected from silica, alumina, ZnO, zirconia, SnO, $Sb_2O_5$, PbO, and mixtures thereof.

16. The ink-jet ink composition of claim 15, wherein the concentration of the metal oxide particles based on the total weight of the composition is in the range 0.1-5% w/w.

17. The ink-jet ink composition of claim 16 wherein the concentration of said metal oxide particles is in the range 0.1 to 3% w/w.

18. The ink-jet ink composition of claim 17 wherein the concentration of said metal oxide particles is in the range 0.2 to 2%.

19. The ink composition of claim 1 wherein the w/w concentration of the $SiO_2$ in the glass frit is 10-50%.

20. The ink-jet ink composition of claim 1 wherein the w/w concentration of the ZnO in the glass frit is 10-30%.

21. The ink-jet ink composition of claim 1 wherein the w/w concentration of the $B_2O_3$ in the glass frit is 3-50%.

22. The ink-jet ink composition of claim 1 wherein the melting point of said second glass frit is above 600° C.

23. The ink-jet ink composition of claim 22 wherein the melting point of said second glass frit is above 650° C.

24. The ink-jet ink composition of claim 22 wherein the melting point of said second glass frit is above 700° C.

25. The ink-jet ink composition of claim 1 wherein said ceramic substrate is glass.

26. The ink-jet ink composition of claim 1 further comprising an organic polymeric binder.

27. The ink-jet ink composition of claim 26 wherein the organic polymeric binder is selected from acrylic resins, carboxylated acrylic resins, polyvynilpyrrolidone, polyvinylbutyral, condensate of urea and aldehydes, polyvinyl resins, cellulose acetate butyrate, and mixtures thereof.

28. The ink-jet ink composition of claim 1 wherein said liquid vehicle consists essentially at least one UV-curable agent.

29. The ink-jet ink composition of claim 1 further comprising at least one UV-curable agent.

30. The ink-jet ink composition of claim 28 wherein the ink curable agent is selected from photo-polymerizable monomers and photo-polymerizable oligomers.

31. The ink-jet ink composition of claim 30 further comprising at least one of: photoinitiators, or photosensitizers.

32. The ink-jet ink composition of claim 1 further comprising at least one additive.

33. The ink-jet ink composition of claim 32 wherein said additive is selected from: wetting agents, dispersing agents, defoamers, rheology control agents, anticorrosive agents, evaporation control agents, organic polymers as binders and fixation agents, and mixtures of any of the above.

34. A printing process comprising:
(a) incorporating into an ink jet printer a pigment-less ink composition, the ink composition comprising:
  a liquid vehicle;
  a first glass frit of sub-micron particles comprising $Bi_2O_3$ as a binding composition having a melting point below 600° C.; and
  a second glass frit of sub-micron particles comprising $SiO_2$, ZnO, and $B_2O_3$ wherein the second glass frit has a melting point of at least 50° C. above the melting point of said first glass frit;
(b) printing said ink composition onto a ceramic substrate;
(c) firing the ceramic substrate at a temperature above the melting point of the first glass frit and below the melting point of the second glass frit to form an etch-like appearance on the ceramic substrate.

35. The printing process of claim 34 wherein said firing is at a temperature of 600° C. or below.

36. The printing process of claim 34 comprising printing drops of variable numbers at a specific location on the ceramic substrate resulting in a uniform or non-uniform distribution of the ink composition drops on the ceramic substrate.

37. The printing process of claim 36 wherein said variable numbers are the same or different for each location on the substrate.

38. The printing process of claim 34 comprising utilizing a random process of two-Dimensional or three-Dimensional data filtering to obtain the etch-like appearance.

39. A ceramic substrate printed with a pattern or image having an etch-like effect, by means of the printing process of claim 34.

* * * * *